No. 767,423. PATENTED AUG. 16, 1904.
W. H. NICHOLLS.
POCKET IMPLEMENT.
APPLICATION FILED AUG. 24, 1903.
NO MODEL.
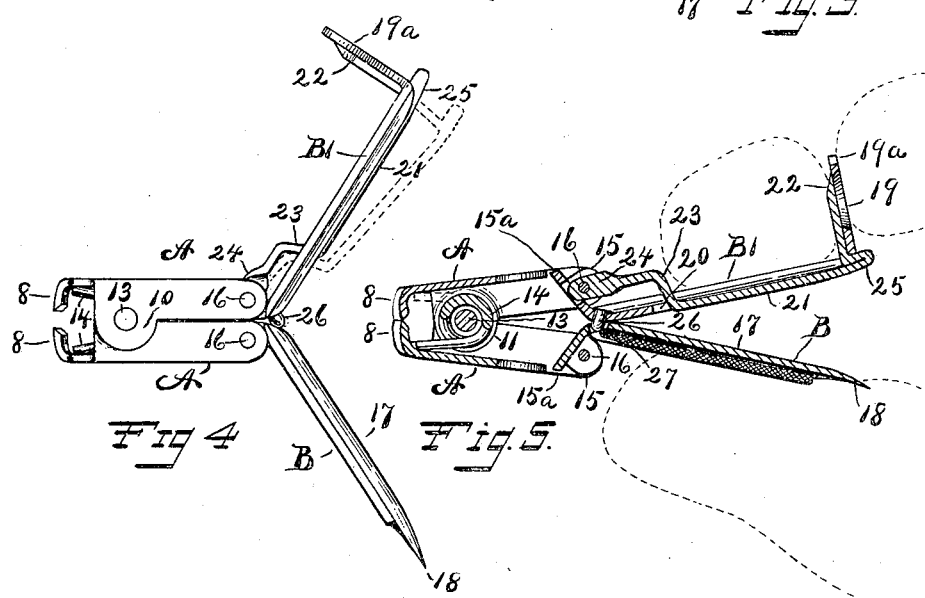

No. 767,423.

Patented August 16, 1904.

UNITED STATES PATENT OFFICE.

WALTER H. NICHOLLS, OF LYNN, MASSACHUSETTS.

POCKET IMPLEMENT.

SPECIFICATION forming part of Letters Patent No. 767,423, dated August 16, 1904.

Application filed August 24, 1903. Serial No. 170,522. (No model.)

*To all whom it may concern:*

Be it known that I, WALTER H. NICHOLLS, a citizen of the United States, residing at Lynn, in the county of Essex and State of Massachusetts, have invented certain new and useful Improvements in Pocket Implements, of which the following is a specification.

My invention relates to pocket implements comprising a finger-nail clipper either with or without a cigar-tip cutter; and the objects of my improvement are simplicity and economy in construction and convenience and efficiency in use.

In the accompanying drawings, Figure 1 is a side elevation of my implement as folded up ready to carry in one's pocket. Fig. 2 is a plan view of the same. Fig. 3 is an end view of the same, showing the left-hand end of Figs. 1 and 2, but with the cigar-cutting knife elevated ready for use. Fig. 4 is a side elevation of my implement with the lever-handles turned back ready for use as a nail-clipper, the cigar-cutting knife being shown in its closed position, but with its open or elevated position indicated in broken lines. Fig. 5 is a central longitudinal section of the same with the lever-handles depressed to close the nail-clipping jaws, the position of the thumb and fingers of the operator in depressing the said lever being indicated in broken lines. Fig. 6 is a plan view of the implement in the position shown in Fig. 5. Fig. 7 is a detached plan view showing the inner face of one of the nail-clipping levers.

The two nail-clipping levers A are preferably formed alike and of sheet metal, with nail-clipping jaws or cutters 8 at one end and bent-up sides 9, with pivotal ears 10 11, the ear 10 being formed in alinement with one of the sides 9 and the ear 11 inset therefrom to form a recess 12, Fig. 7, on its outer side to receive the ear 10 of the companion nail-clipping lever, while in turn the corresponding recess of the said companion member receives the ear 10 of the first-named nail-clipping lever. Thus the outer ear appears on the upper one of the nail-clipping levers when viewed as shown in Figs. 1 and 4, while when viewed from the opposite side the outer ear appears on the lower one of the nail-clipping levers. The levers A A are pivoted together by a pin 13, passing through the ears 10 11, and are forced open by means of a spring 14 of any ordinary construction, preferably a coiled spring wound around the pin 13, with its two arms extending forwardly and bearing on the backs of the said levers in the well-known manner of spring-actuated levers. These levers A A are made so short that a proper leverage for operating the nail-clipping jaws cannot be obtained by the direct application of one's fingers and thumb thereto, and hence I employ the lever-handles B B' on separate pivots. I prefer to pivot these handles by means of ears 15 and pins 16 to the rear ends of the sides 9 of the said levers A, the two lugs of each handle lying in between the said sides, as best shown in Fig. 6. The lever-handle B is a simple plate of sheet metal having a central rib or corrugation 17, with a nail-cleaner 18 at its outer end, while the inner end $15^a$, having the ears 15, is bent at an angle to the main portion of the said lever-handle. Some portion of the implement should form a file, and I prefer to roughen the inner face of the central rib or corrugation for this file, as shown in Fig. 5. The lever-handle B' has substantially the same bent angular form at its pivotal or inner end $15^a$, while its outer end is bent at substantially a right angle and is provided with a hole 19, whereby the said end forms the receiving member $19^a$ of a cigar-tip cutter. The said lever-handle B' is also slotted longitudinally, as at 20, for the major portion of its length to accommodate the body 21 of the cigar-tip-cutting knife 22. This knife-body 21 is provided with an offset 23 to enable its twisted and perforated heel 24 to be pivoted on the same pin 16 as the handle B' is pivoted to one of the clipping-levers. The knife-body is doubled upon itself to form the lifting projection 25 at its outer end and then the blade portion or cutting-knife 22 is bent so as to stand at about right angles to the body 21 and lies closely against the inner side of the receiving member $19^a$ of the cigar-cutter.

Ordinarily the cutting-knife 22 may remain in the position shown in Figs. 1, 2, 4, and 5, where it is out of the way. When a cigar-tip is to be cut, the cutting-knife 22 is elevated, as shown in Fig. 3 and as indicated by broken lines in Fig. 4. This may readily be done by taking hold of the lifting projection 25 and pulling up the knife, so that the cutting edge is about even with the top of the hole 19 in the receiving member 19ª. The tip of the cigar may then be inserted in the said hole and cut off by depressing the said cutting-knife from the position shown in Fig. 3 to that shown in Fig. 1.

The lever-handles B B' have the ends 15ª, that carry the pivotal ears 15, bent at an angle to the body of the said handles, and are provided with a dowel-pin 26 on one of the said handles and a socket 27 on the other, the same being near the angle formed by the said bent ends. When the lever-handles are folded over, as shown in Fig. 1, for putting the implement in the pocket, the spring 14, which forces open the nail-cutting jaws 8, has a tendency to force together the longer or outer ends of clipping-levers A. This also serves to press the butts of the bent ends 15ª of the lever-handles together, and thereby to hold them in the closed or folded position shown in Fig. 1. When the lever-handles are opened outwardly ready for use, the same bent ends 15ª are pressed together by the action of the said spring 14 and held in the position shown in Fig. 4. The lever-handles may then be compressed for forcing the nail-cutting jaws together, as shown in Fig. 5, the dowel 26 engaging the socket 27 and preventing the said lever-handles from slipping on each other as they fulcrum on the angle or corner near the ends 15ª in thus forcing the jaws together with a very powerful leverage.

While the cigar-tip cutter is convenient and desirable, it is evident that it could be omitted, if desired, without any change in the finger-nail clipper. The receiving member 19ª forms a closure for covering the ends of the clipping-jaws.

By my improvement I produce a cheap, simple, and effective nail-clipper which can be compactly folded for carrying in the pocket and which will stay in its folded position without the employment of any special fastening device. It can also be used either with or without a cigar-cutter and still maintain its folded compact form.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. The combination of the pivotal nail-clipper levers, with the pivoted lever-handles arranged to act in connection with said clipper-levers as a compound lever for closing the jaws, and also to fold over upon the outer side of the said clipper-levers when not in use.

2. The combination of the nail-clipper levers pivoted together, with the lever-handles pivoted to the outer ends of the said clipper-levers, and having the said pivoted ends standing at an angle to their body portion, whereby when the said lever-handles are turned backward to bring the said angles together, the said lever members are fulcrumed on the said angles, substantially as described.

3. The combination of the nail-clipping levers pivoted together, with the lever-handles pivoted to the outer ends of the said clipper-levers, and having the said ends stand at an angle to their body portion, and also having a dowel-pin and socket for holding the angles of the said handles together when pressing against each other.

4. The combination of the nail-clipping levers pivoted together, with the lever-handles pivoted to the outer ends of the said clipper-levers and having the angular inner ends, and the spring for forcing open the jaws of the clipping-levers and serving also to hold the lever-handles in position when folded over the outer side of the said clipper-levers.

5. The combination of the pivoted levers A A, with the pivoted lever-handles connected therewith and arranged to fold over upon the outer side of the said levers, one of the said lever-handles having at its outer end a closure for that end of the folded implement, the said closure being perforated as described to form in addition to a closure the receiving member of a cigar-tip cutter, and a knife coacting with the inner face of the said closure substantially as described.

6. In a nail-clipper, the duplicate clipper-levers having clipping-jaws at one end and bent-up sides having pivotal ears, one of the said ears being in alinement with one of the said sides and the other inset therefrom to form an exterior ear-receiving recess, whereby the said duplicate levers may be pivoted together with one ear of each jaw resting in a recess in the companion jaw, substantially as described.

7. In a nail-clipper, the combination of the clipper-levers having the clipper-jaws at one end thereof and bent-up sides and ears on the body back of the said jaws, with the pivot passing through said ears, and the lever-handles having pivoted ears by which the said handles are pivoted to the said sides of the said clipper-levers at the respective outer ends thereof.

8. The combination of the pivotal nail-clipper levers, with the pivoted lever-handles arranged to act in connection with said clipper-levers as a compound lever for closing the jaws, and also to fold over upon the outer side of the said clipper-levers when not in use, one of the said handles having its outer end bent at substantially a right angle to its length and forming a closure at the outer ends of the said handles when thus folded over.

WALTER H. NICHOLLS.

Witnesses:
JAMES SHEPARD,
SHEFFIELD H. CLARKE.